United States Patent [19]

Zhang et al.

[11] Patent Number: 5,242,656

[45] Date of Patent: Sep. 7, 1993

[54] ACTIVE MATERIAL OF HYDROGEN STORAGE ALLOY ELECTRODE

[76] Inventors: Yunshi Zhang; Deying Song; Youxiao Chen; Jun Chen; Genshi Wang; Huatang Yuan; Zuoxiang Zhou; Xuejun Cao; Taoshi Zang; Daxin Zhang, all of NanKai University, TianJin, China, 300071

[21] Appl. No.: 862,105

[22] Filed: Apr. 2, 1992

[30] Foreign Application Priority Data

Jan. 8, 1992 [CN] China ............................. 92100029.4

[51] Int. Cl.$^5$ ............................................. C22C 30/00
[52] U.S. Cl. .................................. 420/417; 420/443; 420/455; 420/580; 420/900; 429/59
[58] Field of Search ............... 420/443, 455, 459, 417, 420/580, 588, 900

[56] References Cited

U.S. PATENT DOCUMENTS 4,623,597 11/1986 Sapru et al. ......................... 420/900
4,952,465 8/1990 Harris et al. ......................... 420/900

*Primary Examiner*—George Wyszomierski
*Attorney, Agent, or Firm*—Pennie & Edmonds

[57] ABSTRACT

This invention relates to an active material of hydrogen storage alloy electrode. The composition of the active material has a formula: $Mm\ Ni_{5-x-y-z-u}\ A_x\ B_y\ C_z\ D_u$; wherein Mm is mischmetal; A=Mn, Sn, or V; B=Cr, Co, Ti, Nb, Zr, or Si; C=Al, Mg, or Ca; D=Li, Na, or K; $0 \leq x \leq 0.95$; $0 \leq y \leq 1$; $0 \leq z \leq 0.7$; and $0.1 \leq u \leq 0.9$ Alternatively, the composition may be of the formula: $Ti_2\ Ni_{1-u}\ D_u$; wherein D=Li, Na, or K; and $0.04 \leq u \leq 0.9$. This active material can relieve the alkali metal ions $M^+$ continuously in charge-discharge process of the alkali batteries, increase the concentration of MOH within the battery, take effect in protecting the cathode and the anode validly, and improve the cycle life and the discharge capacity of the battery.

24 Claims, No Drawings

ACTIVE MATERIAL OF HYDROGEN STORAGE ALLOY ELECTRODE

BACKGROUND

This invention relates to a hydrogen storage alloy electrode, particularly to an active material of hydrogen storage alloy electrode.

A good many of researches have been taken on selecting the active material which may be used for preparing the hydrogen storage alloy electrode during the past twenty and more years. The $LaNi_5$ alloy was chosen initially but the life of the alkali batteries assembled with the electrodes prepared from the $LaNi_5$ alloy was too short. To improve the alkali batteries, many compositions were given, such as Iwakura, C disclosed in Journal of the less-Common Metal 159, 127 (1990), who substituted Co for part of Ni in the $LaNi_5$ to prepare $LaNi_{5-x}Co_x$ ternary alloy. The recent representative improvement is the alloy with composition of $MmNi_{3.8}Co_{0.5}Mn_{0.3}Al_{0.3}$ as described in JP63-175339 and JP63-264869 (1988). However, the cycle lives of alkali batteries assembled with the electrodes prepared from the alloys of aforementioned $LaNi_5$ system of titanium system, zirconium system and calcium system are still not ideal up to now.

It has been found by analysis that the cause lies not only in the stability of the active material itself of the hydrogen storage alloy anode, but also concerned with the nickel oxide cathode of this kind of alkali battery suffered with the corrosion from the electrolyte during the charge - discharge process and the corrosive reaction may be aggravated in pace with the increase of charge-discharge times. The measure adopted generally is to add LiOH at a specific ratio into the KOH electrolyte before sealing of the battery as to protect the nickel oxide cathode. Nevertheless, the effect of this protective measure is not satisfactory. If the LiOH concentration of the electrolyte may be raised along with the cycles of charge-discharge process, the effect of the cathode protection should be improved apparently and the cycle life of the battery should be prolonged greatly. However, it is impossible to add LiOH in the charge-discharge process after sealing up of the battery.

SUMMARY OF THE INVENTION

One object of this invention is to provide novel active materials of hydrogen storage alloy. The alloy anode prepared from the active materials can release alkali metal ions $M^+$ continuously in charge-discharge process of the alkali battery made with the alloy anode.

Another object of the invention is to provide a new type of alkali batteries with prolonged cycle life.

The foregoing and other objects, feature and advantages of the present invention will become more apparent from the following detailed description of the invention.

According to the present invention such corrosion of the cathode can be greatly reduced by adding alkali metal element to the composition of active material of hydrogen storage alloy, it is particularly applicable when the alkali battery is sealed from atmosphere.

DETAILED DESCRIPTION OF THE INVENTION

The present invention is generally applicable throughout the field of hydrogen storage alloy. The alkali metal element, according to the invention, may be added into the composition of hydrogen storage alloy to form compositions with formula (I)

$$G\,D_u \quad (I)$$

wherein G is the composition of hydrogen storage alloy selected from various systems, such as rare earth system ($LaNi_5$ etc.), titanium system (TiNi etc.), calcium system ($CaNi_5$ etc.) and zirconium system ($ZrMn_2$ etc.), D is an alkali metal element, such as Li, Na, or K, u is larger than zero.

In particular, the compositions of hydrogen storage alloy in rare earth system have the following formula II $$MmNi_{5-x-y-z}A_xB_yC_zD_u \quad (II)$$

wherein Mm is the mischmetal; A=Mn, Sn or V; B=Cr, Co, Ti, Nb, Zr or Si; C=Al, Mg or Ca; D=Li, Na or K; $0 \leq x \leq 0.95$, $0 \leq y \leq 1$, $0 \leq z \leq 0.7$, $0 < u \leq 0.9$.

We have found that the structure of the alloy can be improved with the addition of alkali metal such as Li, Na or K. The alkali metal added is capable of forming manifold stable alloy phases with the elements such as Ni, Mn, Al, etc. and dispersing partially into the crystal field of the alloy. When the electrode prepared from the alloy is immersed in the electro-lyte, the alkali metal atoms situated in the defective positions of the phase are first oxidized to form hydroxide. This hydroxide (especially LiOH) has the protective effect for the cathode of the battery, such as nickel oxide cathode. In pace with the cycles of charge-discharge process, the alkali metal atoms of the alloy transform to the hydroxide continuously and increase the concentration of the hydroxide correspondingly, thus make further improvement on the protection effect for the nickel oxide cathode. In the meantime, the hydroxide formed on the surface of hydrogen storage alloy anode is distributed on the defective positions of the alloy surface, which also protects the hydrogen storage alloy not to be oxidized accordingly, with the result that the cycle life of the battery is prolonged greatly. Because the improvement of the alloy composition and the MOH formed in charge-discharge process has relatively high activity, the catalysis activity and the electro-chemical capacity of the hydrogen storage alloy material is improved simultaneously. The experiments of gas-solid reaction indicate that the plateau pressure of the alloy is moderate.

Accordingly, it is preferable that D is Li. It is also preferable that u is about from 0.8 to 0.9. It is better that in formula (II), A is Mn, x is from about 0.3 to about 0.55, y is about from 0.3 to 0.5, z is about from 0.2 to 0.3.

According to the present invention, the compositions of hydrogen storage alloy in TiNi system have the following formula (III)

$$Ti_2Ni_{1-u}D_u \quad (III)$$

wherein D is Li, Na or K; $0 \leq u \leq 0.9$. Preferably D is Li, u is about from 0.4 to 0.9.

A hydrogen storage alloy electrode according to the invention, is provided by using the active material described above. An alkali battery with a o prolonged cycle life is also provided by using the hydrogen storage alloy electrode.

The active material of hydrogen storage alloy of the present invention is prepared in the vacuum induction furnace by a conventional method. The intermetallic alloy formed from the alkali metal ensures the stability of the added components of the alloy.

In contrast to the existing technique, the cycle life of the alkali batteries assembled with the electrodes prepared from the active material of the present invention can be prolonged 2-3 multiple, the normal temperature discharge capacity and the energy density are improved obviously (see Table 1), the high rate discharge performance is also improved (see Table 2), and the maximum of the charge-discharge capacity can be achieved by only 3-5 times of activation treatment (see Table 3).

EXAMPLE 1

The active material of the hydrogen storage alloy prepared in the vacuum induction furnace with the composition of $MmNi_{3.8}Co_{0.5}Mn_{0.4}Al_{0.2}Li_{0.1}$ was pulverized to 300-400 mesh by a vibrational mill, made up with the PTFE solution of 100:8 weight to form a paste. The paste was rolled some times under 60° C. to give an alloy powder sheet of 0.4 mm thickness. The sheet was packed with 1 ton/cm² pressure to one side of the conductive nickel base of suitable size on the basis of the battery case dimensions to prepare the alloy electrode. It was assembled with nickel oxide cathode, 5M KOH+1M LiOH electrolyte solution and nylon nonwoven separator to form the sealed AA type alkali battery (A). The cycle life examination was taken according to IEC standard. The battery capacity descended only 3.6% after 200 charge-discharge cycles. The capacity descent rate averages 0.018% to the cycle. Nevertheless, in the case of the alkali battery (B) prepared from $MmNi_{3.8}Co_{0.5}Mn_{0.4}Al_{0.3}$ alloy with the same technique and examined under the same conditions, the battery capacity descended 8.4% and descent rate averages 0.042%. The contrast data of discharge capacity and energy density of the battery A and B are listed in Table 1.

TABLE 1

The contrast data of discharge capacity and energy density of the AA type alkali batteries assembled with two kinds of active material

| Discharge Multiple Rate | Discharge mAh | | Energy Density | | | |
|---|---|---|---|---|---|---|
| | | | Wh/kg | | Wh/L | |
| | A | B | A | B | A | B |
| 0.2 C | 1236 | 1148 | 58.9 | 55.4 | 192.0 | 175.5 |
| 1 C | 1070 | 1046 | 51.0 | 50.3 | 166.3 | 158.6 |
| 3 C | 966 | 956 | 45.5 | 45.3 | 148.6 | 147.8 |
| 5 C | 912 | 911 | 43.1 | 43.1 | 141.8 | 141.2 |

EXAMPLE 2

The active material of the hydrogen storage alloy with the composition of $MmNi_{3.0}Mn_{0.4}Co_{0.5}Al_{0.2}Li_{0.9}$ was pulverized to 300-400 mesh by the vibrational mill and made up with 2% PVA solution to form a paste. 1 g of the alloy paste was packed on the 2×2 cm² foam nickel plate of 1.2 mm thickness and pressed with 2 ton/cm² pressure to prepare the hydrogen storage alloy electrode (C). It was put into 5M KOH solution, assembled with nickel oxide cathode and Hg/HgO referential electrode, charged 16 hr with 0.1 C, discharged at differential multiple rates. Its electrochemical capacity was examined and contrasted with the electrode (B), the contrast data are listed in Table 2.

TABLE 2

The contrast data of discharge capacity of the AA type alkali batteries assembled with two kinds of alloy material (1 g allow)

| Discharge Multiple Rate | Discharge capacity (mAh) | |
|---|---|---|
| | C | B |
| 0.2 C | 302 | 290 |
| 1 C | 266 | 254 |
| 3 C | 242 | 231 |
| 5 C | 220 | 206 |

EXAMPLE 3

The active material of the hydrogen storage alloy with the composition of $MmNi_{3.4}Co_{0.5}Mn_{0.3}Al_{0.1}Li_{0.8}$ gained in the vacuum induction furnace was prepared according to the technical operation of example 1 to form the sealed AA type alkali battery (D). After the battery was sealed up, only 3 times of activation were necessary to reach the discharge capacity index of the normal demands. The activation times are reduced threefold than the battery (B). The contrast data of activation times of the battery D and B are listed in Table 3.

TABLE 3

The contrast data of activation times of the AA type alkali batteries assembled with two kinds of active material

| Discharge Times | Discharge Capacity mAh | | Discharge Times | Discharge Capacity mAh | |
|---|---|---|---|---|---|
| | D | B | | D | B |
| 1 | 930 | 570 | 7 | 1150 | 932 |
| 2 | 974 | 760 | 8 | 1154 | 967 |
| 3 | 1076 | 820 | 9 | 1174 | 990 |
| 4 | 1117 | 848 | 10 | 1200 | 1010 |
| 5 | 1120 | 886 | 11 | 1202 | 1023 |
| 6 | 1134 | 916 | 12 | 1202 | 1023 |

EXAMPLE 4

The active material of the hydrogen storage alloy with the composition of $TiNi_2Ni_{0.96}Li_{0.04}$ gained in the vacuum induction furnace was prepared according to the technical operation of example 1 to form a sealed AA type alkali battery. The cycle life examination was taken according to IEC standard, the battery capacity descended only 8.46% after 200 charge-discharge cycles, the capacity descent rate averages 0.043% to the cycle, but in the case of the alkali battery prepared from $Ti_2Ni$ alloy by the same technique and examined with the same method, the capacity descent rate averages 0.12% to the cycle.

What is claimed is:

1. An active material of hydrogen storage alloy electrode having composition with a formula $$Mm\ Ni_{5-x-y-z-u}\ A_x\ B_y\ C_z\ D_u;$$

wherein Mm is mischmetal; A=Mn, Sn or V; B=Cr, Co, Ti, Nb, Zr or Si; C=Al, Mg or Ca; D=Li, Na or K; $0 \leq x \leq 0.95$, $0 \leq y \leq 1$, $0 \leq z \leq 0.7$, $0.1 < u \leq 0.9$.

2. An active material according to claim 1 wherein D=Li.

3. An active material according to claim 1 wherein u is from 0.4 to 0.9.

4. An active material according to claim 3 wherein x is from 0.3 to 0.55, y is from 0.3 to 0.5, z is from 0.2 to 0.3.

5. An active material according to claim 1 wherein A=Mn, B=Co, C=Al, D=Li, $0<x\leq0.5$, $0<y\leq0.5$, $0<z\leq0.4$, $0.1<u\leq0.9$.

6. An active material according to claim 5 wherein $x=0.5$, $y=0.5$, $z=0.1$, $u=0.9$.

7. An active material according to claim 1 wherein A=Mn, B=Cr, C=Ca, D=Na, $X=0.5$, $y=0.4$, $z=0.05$, $u=0.5$.

8. An active material according to claim 1 wherein A=Sn, B=Nb, C=Al, D=Li, $x=0.4$, $y=0.1$, $z=0.1$, $u=0.8$.

9. An active material according to claim 1 wherein A=Mn, B=Zr, D=Li, $x=0.4$, $y=0.3$, $z=0$, $u=0.9$.

10. An active material according to claim 1 wherein A=Sn, B=Zr, C=Al, D=K, $x=0.5$, $y=0.2$, $z=0.1$, $u=0.8$.

11. An active material according to claim 1 wherein A=Mn, B=Ti, D =i, $x=0.5$, $y=0.2$, $z=0$, $u=0.9$.

12. An active material according to claim 1 wherein A=Mn, B=Si, D=Li, $x=0.5$, $y=0.3$, $z=0$, $u=0.9$.

13. An active material according to claim 1 wherein $x=0$, $y=0$, $z=0$, D=Li, $u=0.9$.

14. An active material according to claim 1 wherein B=Co or Nb, D=Li, $x=0$, $y=0.5$, $z=0$, $u=0.9$.

15. An active material according to claim 1 wherein A=Mn, B=Si, C=Ca, D=K, $x=0.5$, $y=0.3$, $z=0.1$, $u=0.5$.

16. An active material according to claim 1 wherein A=Sn, B=Si, C=Ca, D=Na, $x=0.4$, $y=0.2$, $z=0.1$, $u=0.5$.

17. An active material according to claim 1 wherein A=Sn, B=Si, C=Ca, D=K, $x=0.4$, $y=0.2$, $z=0.1$, $u=0.5$.

18. A hydrogen storage alloy electrode containing the active material of the composition of claim 1.

19. An active material of hydrogen storage alloy electrode having the composition with a formula $Ti_2Ni_{1-u}D_u$ 

wherein D=Li, Na or K; $0.04<u\leq0.9$.

20. An active material according to claim 19 wherein D=Li.

21. An active material according to claim 19, wherein u is from 0.4 to 0.9.

22. An active material according to claim 19 wherein D=Na, $u=0.5$.

23. An active material according to claim 19 wherein D=K, $u=0.4$.

24. A hydrogen storage alloy electrode containing the active material of the composition of claim 19.

* * * * *